(12) United States Patent
Zheng

(10) Patent No.: US 12,471,604 B1
(45) Date of Patent: *Nov. 18, 2025

(54) AUTOMATIC SMOKER

(71) Applicant: Shaoyan Zheng, Guangdong (CN)

(72) Inventor: Shaoyan Zheng, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/204,637

(22) Filed: May 12, 2025

Related U.S. Application Data

(63) Continuation of application No. 18/900,993, filed on Sep. 30, 2024, now Pat. No. 12,324,440.

(30) Foreign Application Priority Data

| Sep. 14, 2024 | (CN) | 202422265975.9 |
| Sep. 14, 2024 | (CN) | 202422266613.1 |

(51) Int. Cl.
| A23L 27/27 | (2016.01) |
| A23B 4/052 | (2006.01) |
| F23Q 3/00  | (2006.01) |

(52) U.S. Cl.
CPC .............. *A23B 4/052* (2013.01); *F23Q 3/006* (2013.01)

(58) Field of Classification Search
CPC ................................ A23B 4/052; F23Q 3/006
USPC ........................................................ 219/383
See application file for complete search history.

(56) References Cited

U.S. PATENT DOCUMENTS

| 1,999,139 | A | * | 4/1935 | Mcdonald | A24F 19/10 |
| | | | | | 219/268 |
| 2,023,400 | A | * | 12/1935 | Andrews | F23Q 2/30 |
| | | | | | 431/328 |
| 2,117,108 | A | * | 5/1938 | Spencer | F23C 99/00 |
| | | | | | 431/208 |
| 2,123,779 | A | * | 7/1938 | Hite | A24F 15/10 |
| | | | | | 221/148 |
| 2,177,188 | A | * | 10/1939 | Pengilly | F23Q 7/00 |
| | | | | | 221/202 |
| 2,866,924 | A | * | 12/1958 | Delpidio | F23Q 7/00 |
| | | | | | 361/264 |
| 2,932,717 | A | * | 4/1960 | Beattie | F23Q 7/00 |
| | | | | | 219/266 |
| 3,258,003 | A | * | 6/1966 | Turner | A23B 4/0523 |
| | | | | | 126/76 |
| 3,490,878 | A | * | 1/1970 | Russell | A62B 21/00 |
| | | | | | 431/58 |
| 3,788,301 | A | * | 1/1974 | Terry | A01G 13/06 |
| | | | | | 126/59.5 |
| 3,915,145 | A | * | 10/1975 | Tomita | F24B 3/00 |
| | | | | | 126/25 B |
| 4,207,055 | A | * | 6/1980 | Tanaka | F23Q 2/30 |
| | | | | | 431/258 |

(Continued)

*Primary Examiner* — Jimmy Chou
(74) *Attorney, Agent, or Firm* — S.J. Intellectual Property LTD.

(57) ABSTRACT

An automatic smoker includes a smoker body, a pipe and a base. The pipe has a combustion chamber, an inner wall of the combustion chamber is defined with at least one smoke outlet por. The smoker body and the base are detachably assembled, and the pipe is arranged between the smoker body and the base. The smoker body includes an automatic igniter, the automatic igniter includes an ignition needle, the ignition needle extends into the combustion chamber and is configured to ignite a combustion medium within the combustion chamber.

20 Claims, 22 Drawing Sheets

(56) References Cited

U.S. PATENT DOCUMENTS

| | | | | |
|---|---|---|---|---|
| 4,306,575 | A * | 12/1981 | Minozzi, Jr. | G08B 29/145 |
| | | | | 417/406 |
| 4,342,902 | A * | 8/1982 | Ping | F23Q 7/16 |
| | | | | 219/268 |
| 5,473,979 | A * | 12/1995 | Ruben | A47J 37/0704 |
| | | | | 126/25 R |
| 7,568,911 | B1 * | 8/2009 | Draper | F23D 14/28 |
| | | | | 431/278 |
| 8,201,752 | B2 * | 6/2012 | Brodbeck | A61L 9/015 |
| | | | | 239/45 |
| 9,746,194 | B2 * | 8/2017 | Brodbeck | A61M 16/109 |
| 10,641,501 | B2 * | 5/2020 | Kim | F24F 13/02 |
| 10,842,161 | B2 * | 11/2020 | Luther | A47J 37/079 |
| 2009/0293892 | A1 * | 12/2009 | Williams | A24F 40/42 |
| | | | | 131/194 |
| 2014/0261376 | A1 * | 9/2014 | Hofmann | F23Q 13/04 |
| | | | | 126/25 B |
| 2015/0342400 | A1 * | 12/2015 | Hofmann | F23Q 7/14 |
| | | | | 126/25 B |
| 2019/0045834 | A1 * | 2/2019 | Fuisz | A24B 15/24 |
| 2021/0007389 | A1 * | 1/2021 | Fuisz | A24B 15/241 |
| 2021/0227842 | A1 * | 7/2021 | Middleton | A23L 27/27 |
| 2021/0352923 | A1 * | 11/2021 | Li | A47J 37/0754 |
| 2022/0248696 | A1 * | 8/2022 | Hastings | A23B 4/0523 |
| 2022/0361543 | A1 * | 11/2022 | Middleton | A23L 27/27 |
| 2023/0009151 | A1 | 1/2023 | Deng | |
| 2024/0156116 | A1 | 5/2024 | Schob et al. | |

* cited by examiner

AUTOMATIC SMOKER

CROSS REFERENCE TO RELATED APPLICATIONS

This is a continuation of patent application Ser. No. 18/900,993 filed on Sep. 30, 2024, which claims priority benefits to Chinese Patent Application No. 2024222666131, filed on Sep. 14, 2024, and Chinese Patent Application No. 2024222659759, filed on Sep. 14, 2024, the contents of which are both incorporated herein by reference.

TECHNICAL FIELD

The present disclosure relates to the technical field of smokers, and in particular, to an automatic smoker.

BACKGROUND

Smokers are primarily used to smoke food, ingredients, or beverages to give them a unique smoky flavor and enhance their appeal. Currently, smokers typically require placing a combustion medium in the combustion chamber and igniting it with an external heat source, which can be inconvenient to operate.

SUMMARY

A first aspect of the embodiments of the present disclosure provides an automatic smoker, including: a smoker body; a pipe having a combustion chamber, an inner wall of the combustion chamber defined with at least one smoke outlet port; and a base, the smoker body and the base being detachably assembled, and the pipe arranged between the smoker body and the base. The smoker body includes an automatic igniter, the automatic igniter includes an ignition needle, the ignition needle extends into the combustion chamber and is configured to ignite a combustion medium within the combustion chamber.

A second aspect of the embodiments of the present disclosure provides an automatic smoker, including: a smoker body; a pipe having a combustion chamber, an inner wall of the combustion chamber defined with at least one smoke outlet port; and a base, the pipe arranged between the smoker body and the base, the smoker body and the base are detachably assembled, and the smoker body and the base are configured to secure the pipe therebetween during assembly. The smoker body includes: a housing defining a mounting cavity, and a bottom cover, the bottom cover being connected to one side of the housing close to the base, and the bottom cover is defined with an air inlet hole; a thermal insulation cover connected to the bottom cover, the thermal insulation cover defining an air inlet port, a space being provided between the thermal insulation cover and the bottom cover, the air inlet hole in communication with the air inlet port via the space, and the air inlet hole staggered with the air inlet port. The thermal insulation cover abuts against the pipe to close the combustion chamber in response to the smoker body being engaged with the base.

BRIEF DESCRIPTION OF THE DRAWINGS

The description and drawings that constitute a part of the present disclosure are provided for a further understanding of the present disclosure. The illustrative embodiments and their descriptions are provided for explanation but do not constitute improper limitations on the present disclosure.

DETAILED WAY

Figure 1:
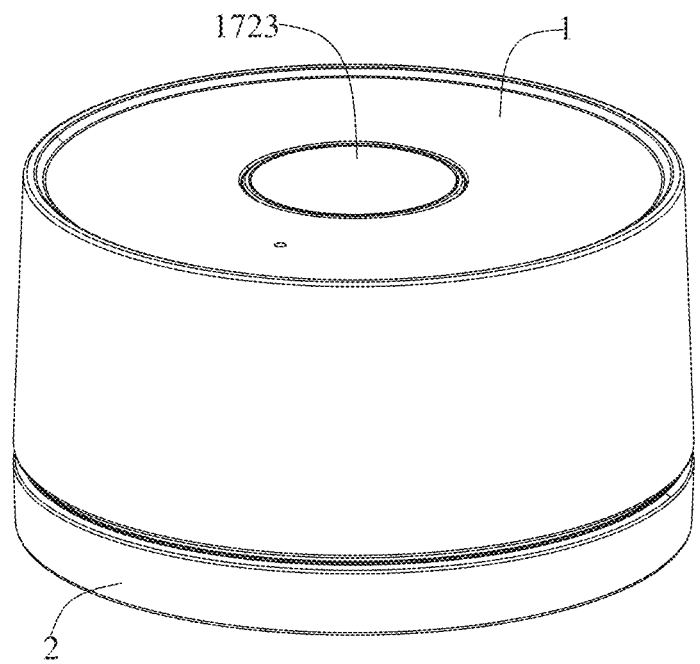
FIG. 1 is an overall schematic structural view of a smoker according to an embodiment of the present disclosure.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of one embodiment may be used according to another embodiment to produce yet another embodiment. Therefore, it is intended that the present disclosure includes such modifications and variations within the scope of the appended claims and their equivalents.

In the description of the present disclosure, the terms "longitudinal", "lateral", "upper", "lower", "front", "back", "left", "right", "vertical", "horizontal", "top", "bottom" and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms "connected", "connecting" and "arranged" used in the present disclosure should be understood in a broad sense. For example, it may be a fixed connection or a detachable connection; it may be directly connected or indirectly connected through an intermediate component; it may also be a wired electrical connection, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

Figure 2:
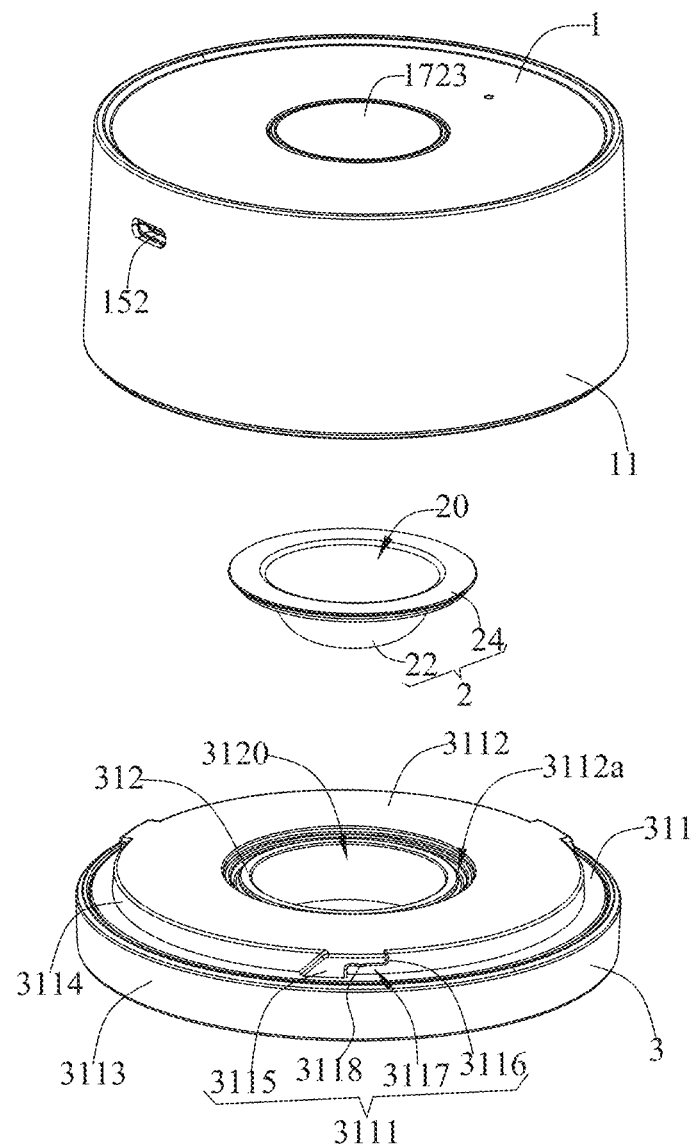
FIG. 2 is an exploded view of a smoker according to an embodiment of the present disclosure.

As illustrated in FIG. 1 and FIG. 2, the present embodiment relates to a smoker, which is mainly configured to burn or incompletely burn a combustion medium (such as wood chips) to generate smoke. The smoker includes a smoker body 1, a pipe 2 and a base 3.

In some embodiments, the smoker body 1 and the base 3 are cylindrical. The pipe 2 is arranged between the smoker body 1 and the base 3. The pipe 2 has a combustion chamber 20, and the combustion medium is burned or incompletely burned in the combustion chamber 20. The smoker body 1 and the base 3 are detachably assembled. By assembling the smoker body 1 and the base 3, the pipe 2 can be pressed by them, thus being fixed. In addition, the assembly of the smoker body 1 and the base 3 can also enclose the combustion chamber 20, thereby preventing the exposure of the combustion chamber 20, reducing the risk during the combustion process, and enhancing the safety of the smoker.

Figure 3:
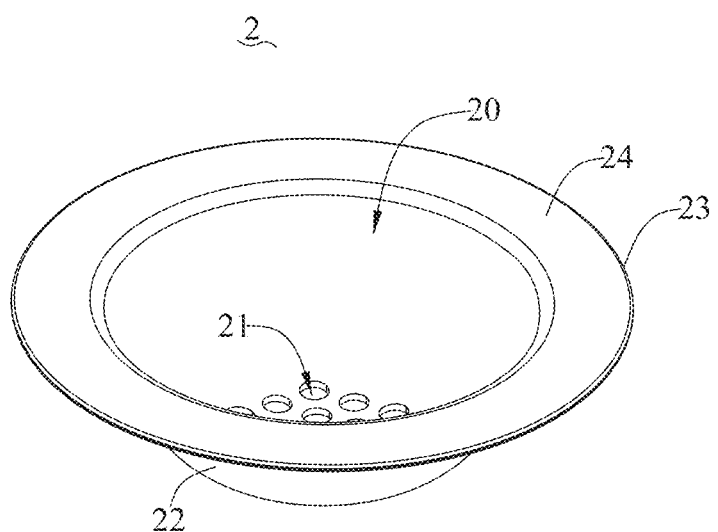
FIG. 3 is a schematic structural view of a pipe according to an embodiment of the present disclosure.

As illustrated in FIG. 3, in the present embodiment, the pipe 2 is defined with at least one outlet port 21, and the smoke outlet port 21 is in communication with the combustion chamber 20. The design of the smoke outlet port 21 allows the smoke generated from the combustion or incomplete combustion within the combustion chamber 20 to be quickly expelled, enabling the smoker to emit smoke rapidly.

As illustrated in FIG. 4 to FIG. 9, in one embodiment, the smoker body 1 includes a housing 11, a bottom cover 12, a thermal insulation cover 13, a blower component 14, a circuit board 15, a power supply 16 and an automatic igniter 18.

The housing 11 and the bottom cover 12 are assembled to form a casing, and the casing is cylindrical. The housing 11 is cylindrical as a whole and has a mounting cavity 110. The bottom cover 12 is connected to a side of the housing 11 proximal to the base 2, thereby closing an opening of the mounting cavity 110. An end surface of the bottom cover 12 proximal to the base 2 is provided with an air inlet hole 120 that runs through the bottom cover 12. The thermal insulation cover 13 is connected to a side of the bottom cover 12 away from the housing 11. The thermal insulation cover 13 is defined with an air inlet port 130. When the smoker body 1 and the base 3 are assembled, the air inlet hole 120 and the air inlet port 130 are in communication with the combustion chamber 20. Airflows in through the air inlet hole 120 and then enters the combustion chamber 20 via the air inlet port 130, supplying the combustion chamber 20 with additional air to aid combustion.

The blower component 14 is arranged in the mounting cavity 110 and has a blower body 141 and an air outlet port 142. The blower body 141 is fixedly mounted on the bottom cover 12, and the air outlet port 142 communicates with the air inlet hole 120 to allow air to be blown into the combustion chamber 20. The circuit board 15 is arranged in the mounting cavity 110. The circuit board 15 is fixedly mounted on the bottom cover 12 and is electrically connected to the blower component 14. The circuit board 15 is configured to control the start or stop of the automatic igniter 18 and the blower component 14. The automatic igniter 18 is arranged in the mounting cavity 110 and is connected to the bottom cover 12. The automatic igniter 18 includes an ignition needle 181. The ignition needle 181 penetrates the bottom cover 12 and is installed in the air inlet port 130. There is a gap between the ignition needle 181 and a side wall of the air inlet port 130, enabling the air entering from the air inlet hole 120 to enter the combustion chamber 20 from the air inlet port 130. The ignition needle 181 passes through the air inlet port 130 and enters the combustion chamber 20 to ignite the combustion medium placed in the combustion chamber 20. The power supply 16 is arranged in the mounting cavity 110. The power supply 16 is fixedly connected to the bottom cover 12. The power supply 16 is electrically connected to the circuit board 15, so as to supply power to the circuit board 15, the automatic igniter 18 and the blower component 14.

It should be noted that after the automatic igniter 18 is powered on, one end of the ignition needle 181 extending into the combustion chamber 20 ignites the combustion medium due to the electric spark generated by the high-voltage discharge. The ignition needle 181 of the automatic igniter 18 is positioned in the air inlet port 130 and extends into the combustion chamber 20, placing the ignition needle 181 at an upwind position. During the ignition operation of the ignition needle 181, the air enters the combustion chamber 20 through the air inlet port 130, promoting the combustion of the combustion medium, and enabling the automatic igniter 18 to ignite the combustion medium within the combustion chamber 20 more easily and quickly.

As illustrated in FIG. 4 to FIG. 9, in one embodiment, in an axial direction of the air inlet port 130, a projection position of the air inlet port 130 on an inner wall of the combustion chamber 20 at least partially overlaps with the position of the smoke outlet port 21. This configuration minimizes the distance between the air inlet port 130 and the smoke outlet port 21, allowing the air to pass through the combustion chamber 20 more quickly, which not only promotes the combustion of the combustion medium, but also accelerates the expulsion of smoke from the combustion chamber 20, thereby enhancing the smoke output speed of the smoker. Additionally, it also prevents the smoke generated in the combustion chamber 20 from spreading towards the smoker body 1, thus avoiding contamination of the smoker body 1. In the present embodiment, the air inlet port 130 is located directly above the smoke outlet port 21.

In one embodiment, a space 10 is provided between the thermal insulation cover 13 and the bottom cover 12, allowing the air entering the air inlet hole 120 to pass through. The thermal insulation cover 13 is defined with an air inlet port 130, and the air inlet port 130 is staggered with the air inlet hole 120.

As illustrated in FIG. 6 to FIG. 9, it should be noted that when the smoker body 1 and the base 3 are assembled, the thermal insulation cover 13 fits an end surface of the pipe 2 proximal to the smoker body 1, enclosing the combustion chamber 20 to ensure the safety of the combustion process. Meanwhile, the air inlet port 130 is in communication with the combustion chamber 20, providing the combustion chamber 20 with combustion-supporting air and ensuring a smooth combustion process. The combustion-supporting air includes but is not limited to oxygen, air, etc.

Figure 9:
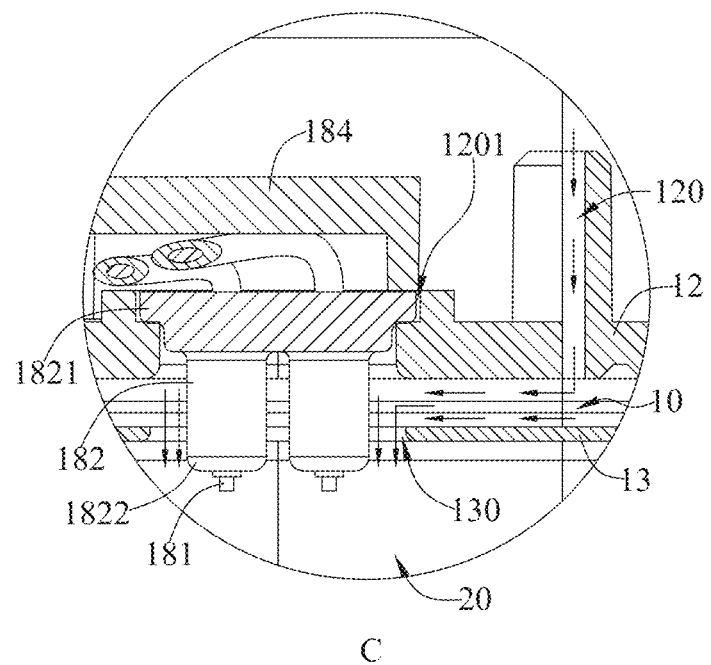
FIG. 9 is an enlarged view of area C shown in FIG. 7.
Figure 10:
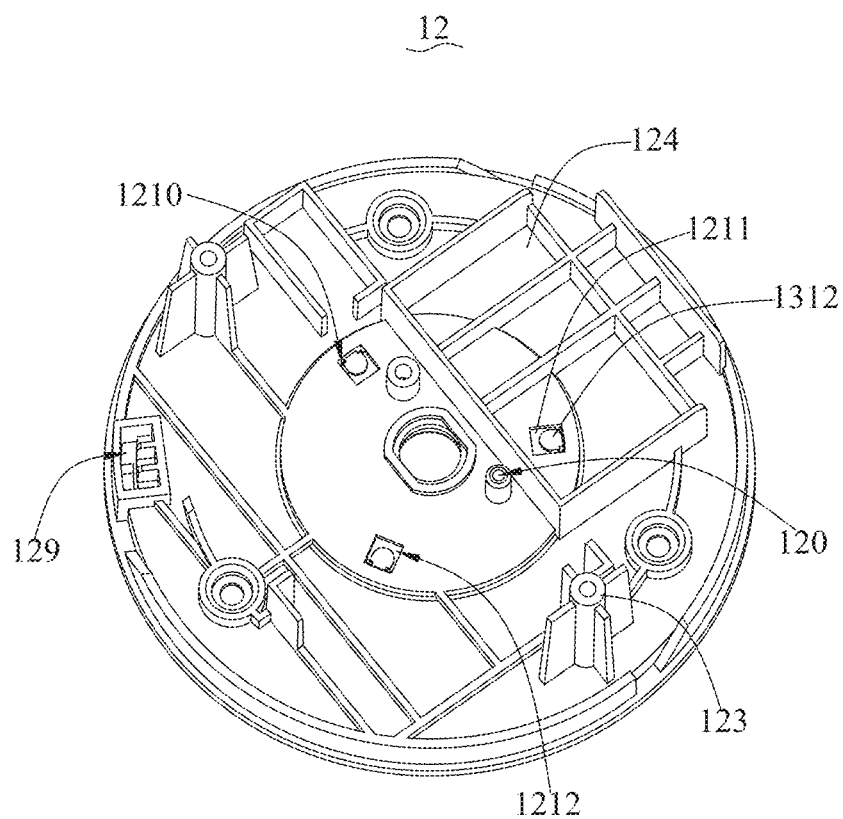
FIG. 10 is a schematic structural view of a bottom cover according to an embodiment of the present disclosure.

It should also be noted that the dotted arrow in FIG. 9 indicates the direction of the airflow. Since the thermal insulation cover 13 needs to be in contact with the pipe 2, the heat generated by the combustion or incomplete combustion of the combustion medium will heat up the thermal insulation cover 13 rapidly. The space 10 is formed between the thermal insulation cover 13 and the bottom cover 12, enabling the air between an end surface of the thermal insulation cover 13 in contact with the pipe 2 and the bottom cover 12 to form an insulation zone for heat isolation. Therefore, when the combustion medium burns or is not fully burned in the combustion chamber 20, the heat of the thermal insulation cover 13 can be prevented from being directly transferred to the bottom cover 12. In addition, the air inlet hole 120 and the air inlet port 130 are both in communication with the space 10. In other words, the air inlet hole 120 is in communication with the air inlet port 130 through the space 10, allowing the combustion-supporting air to be sent into the combustion chamber 20. The air inlet hole 120 and the air inlet port 130 are staggered, generating a blocking effect on the combustion-supporting air entering the space 10, thereby causing the air in the space 10 to absorb part of the heat on the thermal insulation cover 13. Meanwhile, the heat absorbed by the combustion-supporting air is expelled from the combustion chamber 20 along with the smoke, achieving a cooling effect for the thermal insulation cover 13. The smoker configured in this way not only prevents the heat generated by combustion or incomplete combustion from being transferred to the smoker body 1, but also cool the thermal insulation cover 13, thereby improving the working environment of the smoker body 1 and enhances its service life.

Figure 5:
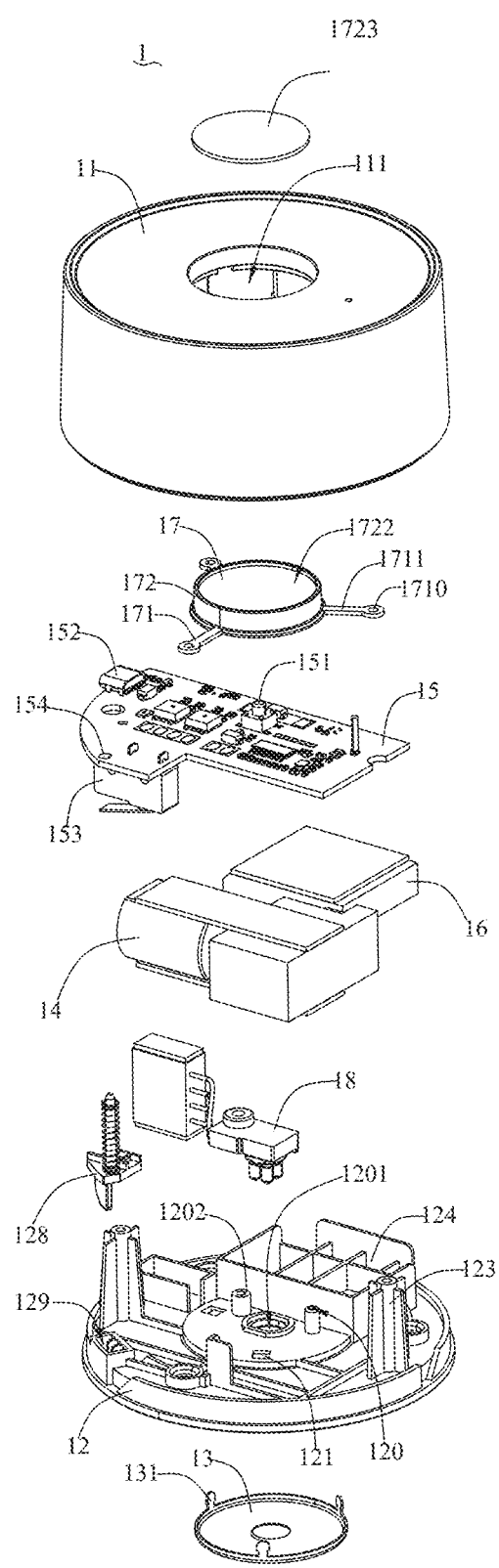
FIG. 5 is an exploded view of a smoker body according to another embodiment of the present disclosure.
Figure 6:
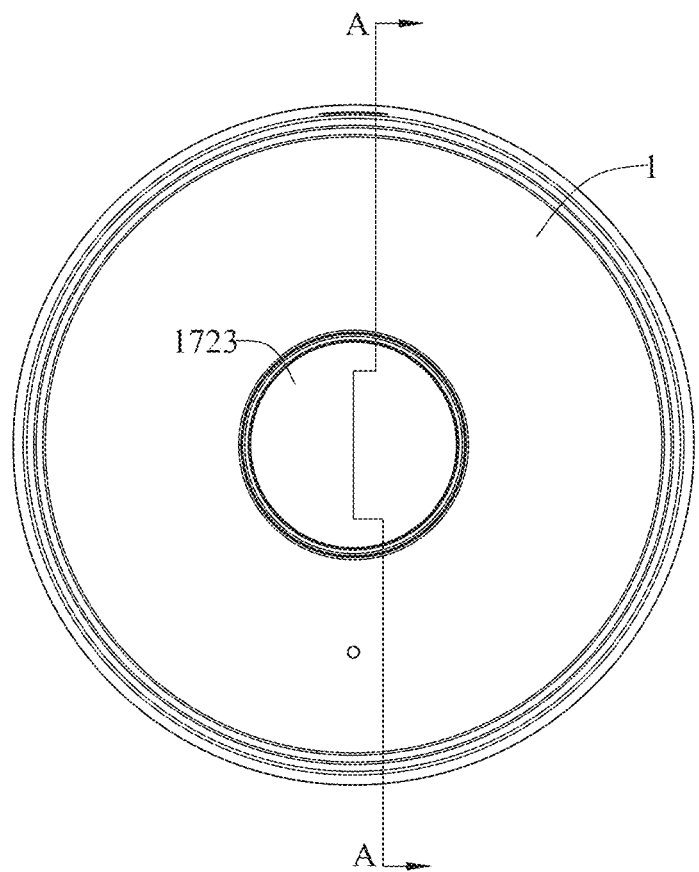
FIG. 6 is a top view of a smoker according to an embodiment of the present disclosure.
Figure 7:
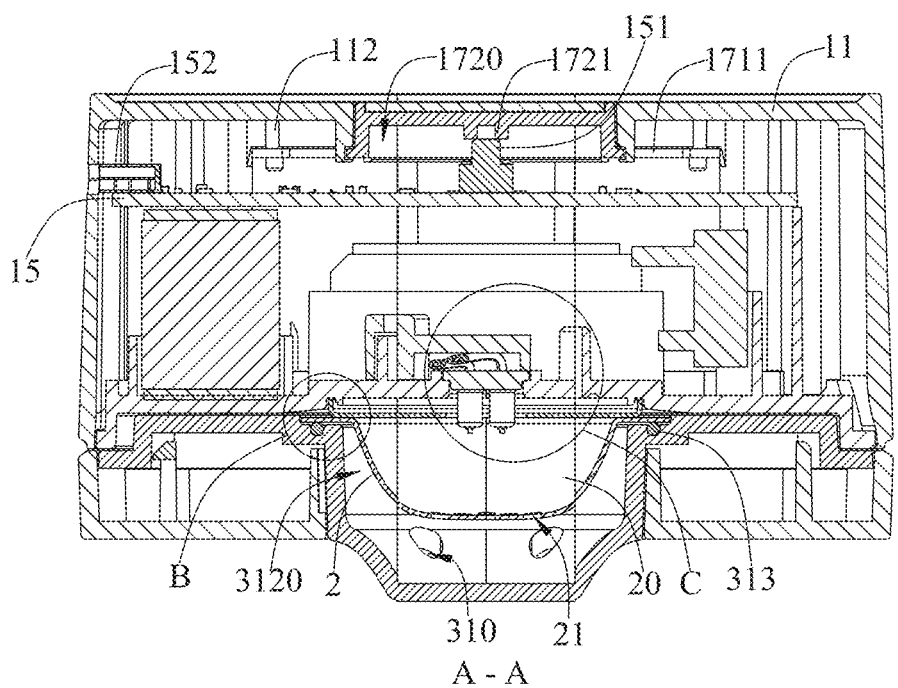
FIG. 7 is a sectional view along line A-A shown in FIG. 6.
Figure 8:
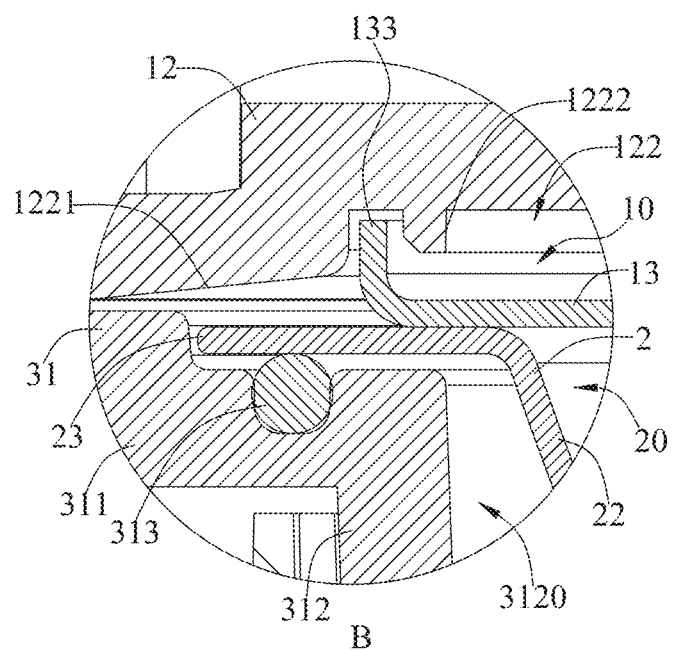
FIG. 8 is an enlarged view of area B shown in FIG. 7.

As illustrated in FIG. 5, in one embodiment, a first connecting part 121 is provided on a side of the bottom cover 12 proximal to the thermal insulation cover 13. A second connecting part 131 is provided on a side of the thermal insulation cover 13 proximal to the bottom cover 12. The first connecting part 121 and the second connecting part 131 are detachably assembled, allowing the user to replace the thermal insulation cover 13 conveniently.

As illustrated in FIG. 2, FIG. 5, FIG. 10 and FIG. 12, in one embodiment, the first connecting part 121 is a plug-in hole 1210, and a hook part 1211 is provided in the plug-in hole 1210. A first end of the hook part 1211 is flush with an end surface of the bottom cover 12 proximal to the base 3, and an end surface of a second end of the hook part 1211 is lower than an opening of the plug-in hole 1210 away from the base 3, allowing the end surface of the second end of the hook part 1211 and an inner wall of the bottom cover 12 to form a groove 1212 for accommodating a portion of the second connecting part 131.

The second connecting part 131 includes a connecting section 1311 and a bending section 1312. A first end 1311$a$ of the connecting section 1311 is connected to the thermal insulation cover 13. A second end 1311$b$ of the connecting section 1311 is connected to the bending section 1312. The bending section 1312 is accommodated in the groove 1212, allowing the bending section 1312 to be engaged with the hook part 1211, thereby securing the thermal insulation cover 13.

In one embodiment, a width of the connecting section 1311 is smaller than that of the bending section 1312, therefore the connection between the connecting section 1311 and the bending section 1312 forms a step structure, which facilitates to bend the bending section 1312. An angle between the bending section 1312 and the connecting section 1311 is an acute angle or a right angle, enabling the bending section 1312 to be engaged with the hook part 1211.

It should be noted that the connection section 1311 and the bending section 1312 of the second connecting part 131 can be bent under an external force and restored to the original state under another external force. Before the second connecting part 131 is assembled with the first connecting part 121, the connection section 1311 and the bending section 1312 are coplanar. During the assembly of the thermal insulation cover 13 and the bottom cover 12, the bending section 1312 is inserted into the plug-in hole 1210, allowing the connection section 1311 to be fully housed within the plug-in hole 1210, while the bending section 1312 protrudes through the plug-in hole 1210. Then an external force is applied to the bending section 1312, causing the bending section 1312 to be bent and fit into the groove 1212, thereby completing the assembly of the thermal insulation cover 13 and the bottom cover 12. When disassembling the thermal insulation cover 13, it is only necessary to restore the bending section 1312 to be coplanar with the connection section 1311 with an external force.

As illustrated in FIG. 2, FIG. 5, FIG. 10 and FIG. 11, in one embodiment, the thermal insulation cover 13 includes a cover body 132 and an annular wall 133. The cover body 132 is configured to fit with the pipe 2 to enclose the combustion chamber 20. The annular wall 133 has a fixed end 1331 and a free end 1332. The fixed end 1331 is connected to the cover body 132, and the free end 1332 extends to one side of the bottom cover 12. The free end 1332 of the annular wall 133 is configured to abut against an end surface of the bottom cover 12 proximal to the base 3, forming a space 10 between the bottom cover 12 and the cover body 132.

In one embodiment, one side of the bottom cover 12 proximal to the base 3 is defined with a mounting groove 122, the air inlet hole 120 is in communication with the mounting groove 122, and the plug-in hole 1210 is provided in the mounting groove 122. The thermal insulation cover 13 is installed in the mounting groove 122, and the free end of the annular wall 133 abuts against an inner wall of the mounting groove 122.

In one embodiment, an opening end of the mounting groove 122 is defined with an bevel 1221. With such a configuration, when the smoker body 1 and the base 3 are assembled, the direct contact between the pipe 2 and the bottom cover 12 can be effectively avoided, thereby avoiding the direct heat transfer from the pipe 2 to the bottom cover 12, further improving the heat insulation efficacy of the smoker body 1.

In the present embodiment, the mounting groove 122 is a groove with a circular cross-section, and the thermal insulation cover 13 is substantially circular and fits the mounting groove 122. The annular wall 133 is an annular wall connected to an edge of the cover body 132. Three first connecting parts 121 are provided, and the three first connecting parts 121 are distributed in a circular pattern at equal intervals at a bottom of the mounting groove 122. Three second connecting parts 131 are also provided, and the three second connecting parts 131 are distributed in a circular pattern at equal intervals at the free end of the annular wall 133 and are all connected to the free end. The cover body 132, the annular wall 133 and the second connecting part 131 are integrally formed. A material of the thermal insulation cover 13 is stainless steel, allowing the second connecting part 131 to be bent or restored to its original shape multiple times.

In one embodiment, an annular protrusion 1222 is provided on a bottom wall of the mounting groove 122. The annular protrusion 1222 and a side wall of the mounting groove 122 form an annular groove, and the annular wall 133 is assembled in the annular groove, enabling the annular protrusion 1222 to shield the annular wall 133, thereby improving the air tightness between the thermal insulation cover 13 and the bottom cover 12. Meanwhile, the annular groove can limit the annular wall 133 and improve the reliability of the assembly between the bottom cover 12 and the thermal insulation cover 13.

In one embodiment, a mounting column 123 is provided on the bottom cover 12, one end of the mounting column 123 is connected to the bottom cover 12, and another end extends away from the bottom cover 12. The circuit board 15 is arranged above the blower component 14, and the circuit board 15 is connected to the mounting column 123 and secured by a fastening screw. In other embodiments, the circuit board 15 can also be connected to the mounting column 123 by means of gluing, plugging, etc.

Figure 4:
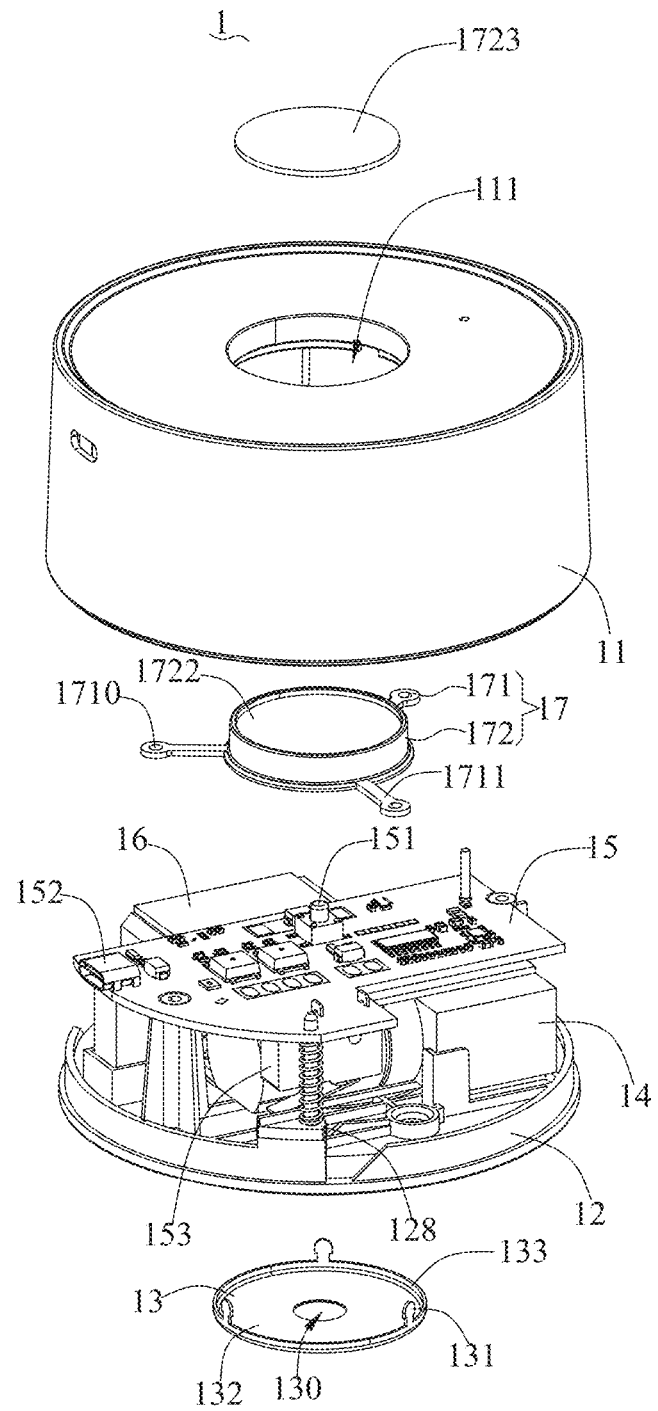
FIG. 4 is an exploded view of a smoker body according to an embodiment of the present disclosure.
Figure 13:
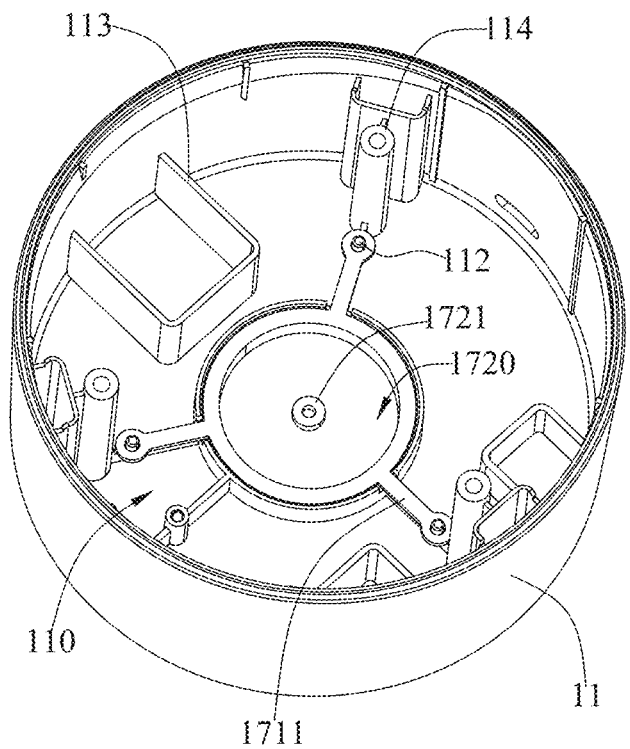
FIG. 13 is a schematic structural view of a housing and a switch button according to an embodiment of the present disclosure.
Figure 14:
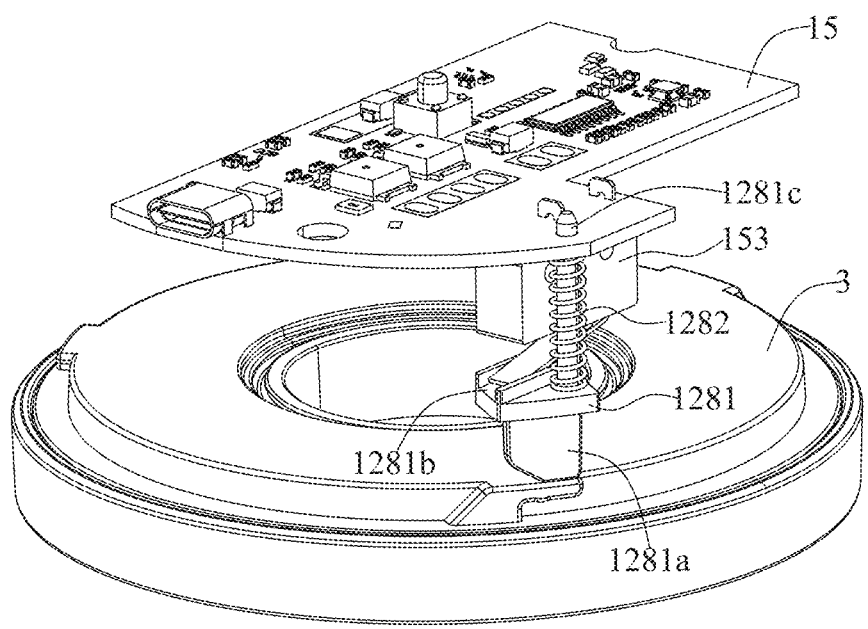
FIG. 14 is a schematic structural view of a base, a circuit board and a trigger component according to an embodiment of the present disclosure.
Figure 15:
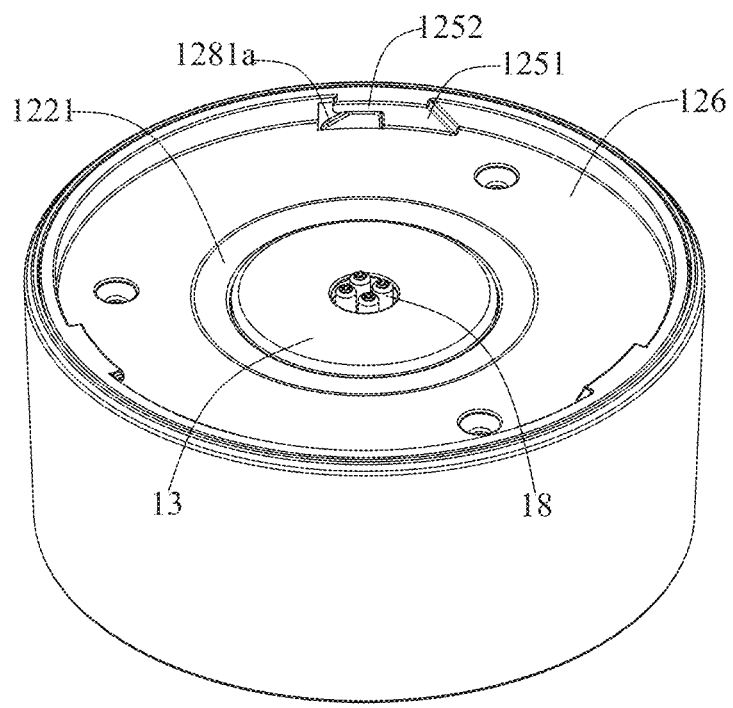
FIG. 15 is a schematic structural view of a smoker body according to an embodiment of the present disclosure.
Figure 16:
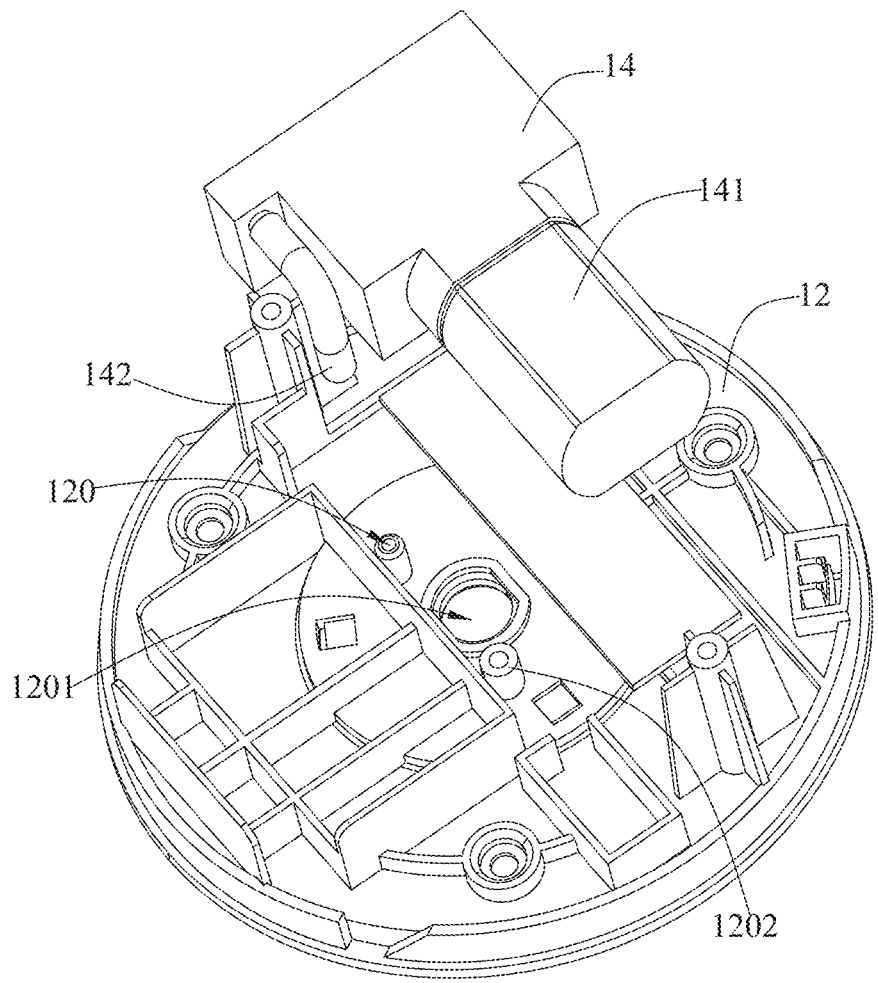
FIG. 16 is a schematic structural view of a bottom cover and a blower component according to an embodiment of the present disclosure.
Figure 17:
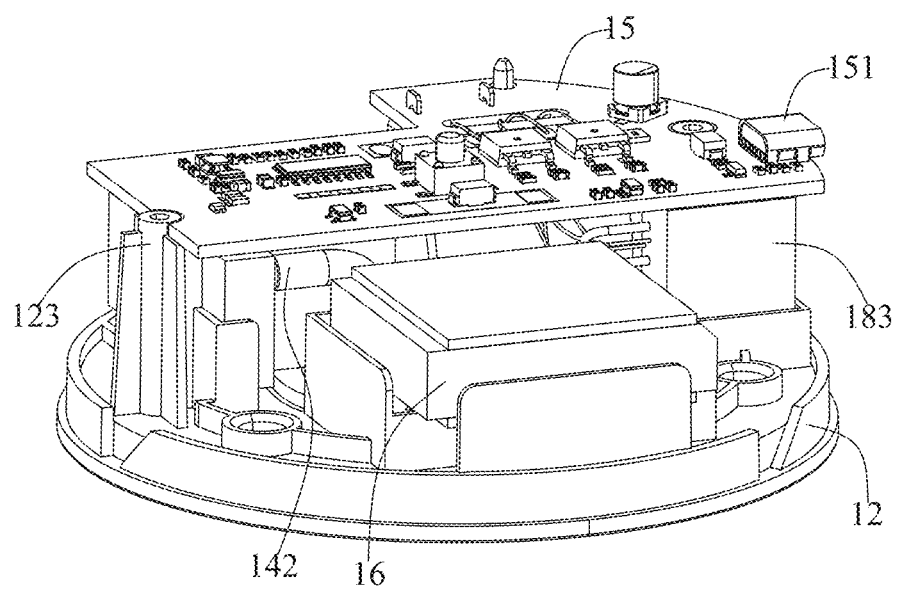
FIG. 17 is a schematic structural view of a bottom cover, a blower component, a circuit board and a power supply according to an embodiment of the present disclosure.
Figure 18:
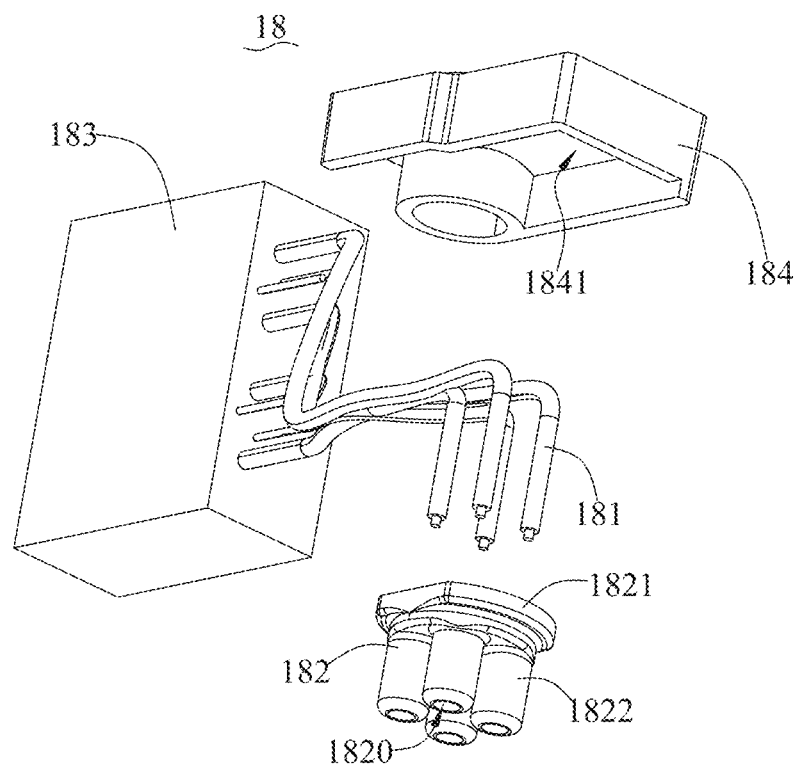
FIG. 18 is an exploded view of an automatic igniter according to an embodiment of the present disclosure.

As illustrated in FIG. 4, FIG. 5 and FIG. 13, in one embodiment, a control switch 151 is arranged on one side of the circuit board 15 away from the blower component 14, so as to control the start or stop of the smoker. An end surface of the housing 11 away from the bottom cover 12 is defined with a mounting port 111, and the mounting port 111 is in communication with the mounting cavity 110. The smoker body 1 also includes a switch button 17. The switch button 17 includes a first part 171 and a second part 172. The first part 171 is housed in the mounting cavity 110 and connected to an inner wall of the mounting cavity 110. The second part 172 is connected to the first part 171 and is movably accommodated in the mounting port 111. The second part 172 is configured to abut against the control switch 151, thereby triggering the control switch 151 when the switch button 17 is pressed.

In one embodiment, the first part 171 includes three connecting arms 1711, and the three connecting arms 1711 are connected to the second part 172. One end of the connecting arm 1711 away from the second part 172 is defined with a sleeve hole 1710. A guide column 112 is protruded on an inner wall of the mounting cavity 110. The sleeve hole 1710 is configured to engage with the guide column 112 to guide the movement of the switch button 17. The second part 172 is cylindrical, and the three connecting arms 1711 are evenly spaced on an outer wall of the second part 172. One end surface of the second part 172 proximal to the circuit board 15 is defined with a circular slot 1720, and an abutment column 1721 is provided at the center of the circular slot 1720, and the abutment column 1721 is configured to abut against the control switch 151.

As illustrated in FIG. 4, FIG. 5 and FIG. 13, in one embodiment, an end surface of the second part 172 away from the first part 171 is defined with a decorative slot 1722, and a decorative sheet 1723 is provided in the decorative slot 1722 to enhance the aesthetics of the switch button 17.

In one embodiment, the circuit board 15 is provided with a charging port 152, and a side wall of the housing 11 is defined with a through groove for accommodating the charging port 152.

In one embodiment, a locking part 124 for installing the power supply 16 is provided on the bottom cover 12. A tightening part 113 is provided in the mounting cavity 110. When the bottom cover 12 is assembled with the housing 11, the tightening part 113 tightens and fixes the blower component 14 and the power supply 16 on the bottom cover 12. A connecting column 114 is also provided in the mounting cavity 110, and the connecting column 114 is defined with a threaded hole. A position of the bottom cover 12, corresponding to the connecting column 114, is defined with a through hole. A fastening screw passes through the through hole and threads into threaded hole, securing the bottom cover 12 and the housing 11.

As illustrated in FIG. 2, FIG. 4, FIG. 5, FIG. 14 and FIG. 15, in one embodiment, a power-off switch 153 is also provided on the circuit board 15. The power-off switch 153 is configured to conduct or cut off the electrical connection between the circuit board 15 and the power supply 16. A trigger component 128 connected to the power-off switch 153 is provided on the bottom cover 12. When the smoker body 1 is separated from the base 3 or is not properly assembled, the trigger component 128 puts the power-off switch 153 in an power-off state, and the smoker body 1 is in a completely power-off state; when the smoker body 1 is properly assembled with the base 3, the trigger component 128 triggers the power-off switch 153 into an power-on state, therefore the smoker can work normally. The smoker configured as such can only be powered on after the smoker body 1 and the base 3 are properly assembled, further improving the safety of the smoker during use.

In one embodiment, the bottom cover 12 is defined with a receiving groove 129, and the receiving groove 129 passes through the bottom cover 12. The trigger component 128 includes a trigger rod 1281 and an elastic member 1282. The trigger rod 1281 includes a driving head 1281a, a trigger head 1281b and a connecting rod 1281c.

In some embodiments, the driving head 1281a is movably installed in the receiving groove 129, and when the smoker body 1 and the base 3 are assembled, the base 3 can move the driving head 1281a along the receiving groove 129 toward the circuit board 15. The trigger head 1281b and the connecting rod 1281c are both arranged in the mounting cavity 110. One side of the trigger head 1281b away from the circuit board 15 is connected to the driving head 1281a, and one side of the trigger head 1281b proximal to the circuit board 15 is connected to the connecting rod 1281c. One end of the connecting rod 1281c away from the driving head 1281a is movably connected to the circuit board 15. The elastic member 1282 is sleeved on the connecting rod 1281c, one end of the elastic member 1282 is connected to the trigger head 1281b, another end of the elastic member 1282 is connected to the circuit board 15. The elastic member 1282 is in a compressed state, squeezing the trigger rod 1281 toward a direction away from the circuit board 15. An end surface of the trigger head 1281b proximal to the connecting rod 1281c is also connected to the power-off switch 153, indicating the power-off switch 153 is in a power-on state or a power-off state.

It should be noted that the power-off switch 15 is a travel switch or a micro switch. The circuit board 15 is defined with a mounting hole 154, and one end of the connecting rod

1281c away from the driving head 1281a is movably mounted in the mounting hole 154. The elastic member 1282 is a compression spring.

As illustrated in FIG. 4, FIG. 5, FIG. 16 to FIG. 18, in one embodiment, the bottom cover 12 is also defined with a snap-in slot 1201. The automatic igniter 18 also includes a needle seat 182, a high-voltage component 183 and a fixing cover 184. The needle seat 182 has an assembly end 1821 and an ignition end 1822. The assembly end 1821 is installed in the snap-in slot 1201. The ignition end 1822 extends into the combustion chamber 20 through the snap-in slot 1201 and the air inlet port 130. The needle seat 182 is defined with a hole 1820 that passes through the assembly end 1821 and the ignition end 1822. The ignition needle 181 is inserted through the hole 1820, with a needle tip protruding from the ignition end 1822. The high-voltage component 183 is installed on the bottom cover 12 and is electrically connected to the circuit board 15 through a wire. The high-voltage component 183 is connected to the ignition needle 181 through a wire, allowing the needle tip of the ignition needle 181 to discharge, thereby generating an electric spark and igniting the combustion medium. The fixing cover 184 is arranged in the mounting cavity 110 and is located on one side of the snap-in slot 1201. The fixing cover 184 is connected to the bottom cover 12, securing the needle seat 182 and a portion of the wire on the bottom cover 12.

In the present embodiment, the snap-in slot 1201 is a waist-shaped slot, and the assembly end 1821 of the needle seat 182 is designed to be waist-shaped as well, fitting into the snap-in slot 1201. A circular column 1202 is also provided on the bottom cover 12, and the circular column 1202 is located around the snap-in slot 1201. The fixing cover 184 is secured to the circular column 1202 by a fastening screw, allowing the assembly end 1821 to be fitted into the snap-in slot 1201. An end surface of the fixing cover 184 proximal to the bottom cover 12 is defined with an avoiding groove 1841, enabling the wire to be inserted and connected to the ignition needle 181.

As illustrated in FIG. 2, FIG. 3, FIG. 6 to FIG. 9, in one embodiment, the definition of the pipe 2 is a venting device which includes a pipe body 22 and a flange 24 including an anti-slip edge 23. The flange 24 extends outwardly from an outer edge of the pipe body 22 and is connected to the pipe body 22, the pipe body 22 is a curved shaped body, and a bottom of the curved shape body has at least one smoke outlet port 21. The pipe body 22 is cup-shaped, a combustion chamber 20 is formed therein. A bottom surface of the combustion chamber 20 is spherical, which facilitates cleaning of the ash. A bottom of the combustion chamber 20 is defined with the at least one outlet port 21, which penetrates the pipe body 22.

It should be noted that the flange 24 is a circular sheet structure, and an inner edge of the circular sheet structure is connected to an outer edge of the pipe body 22 proximal to the bottom cover 12. In the present embodiment, the anti-slip edge 23 is integrally formed with the pipe body 22. The at least one smoke outlet port 21 prevents ash from falling out of the at least one smoke outlet port 21 and contaminating the base 3 as a result of combustion or incomplete combustion, but also allow the generated smoke to be expelled from the combustion chamber 20 more quickly.

Figure 19:
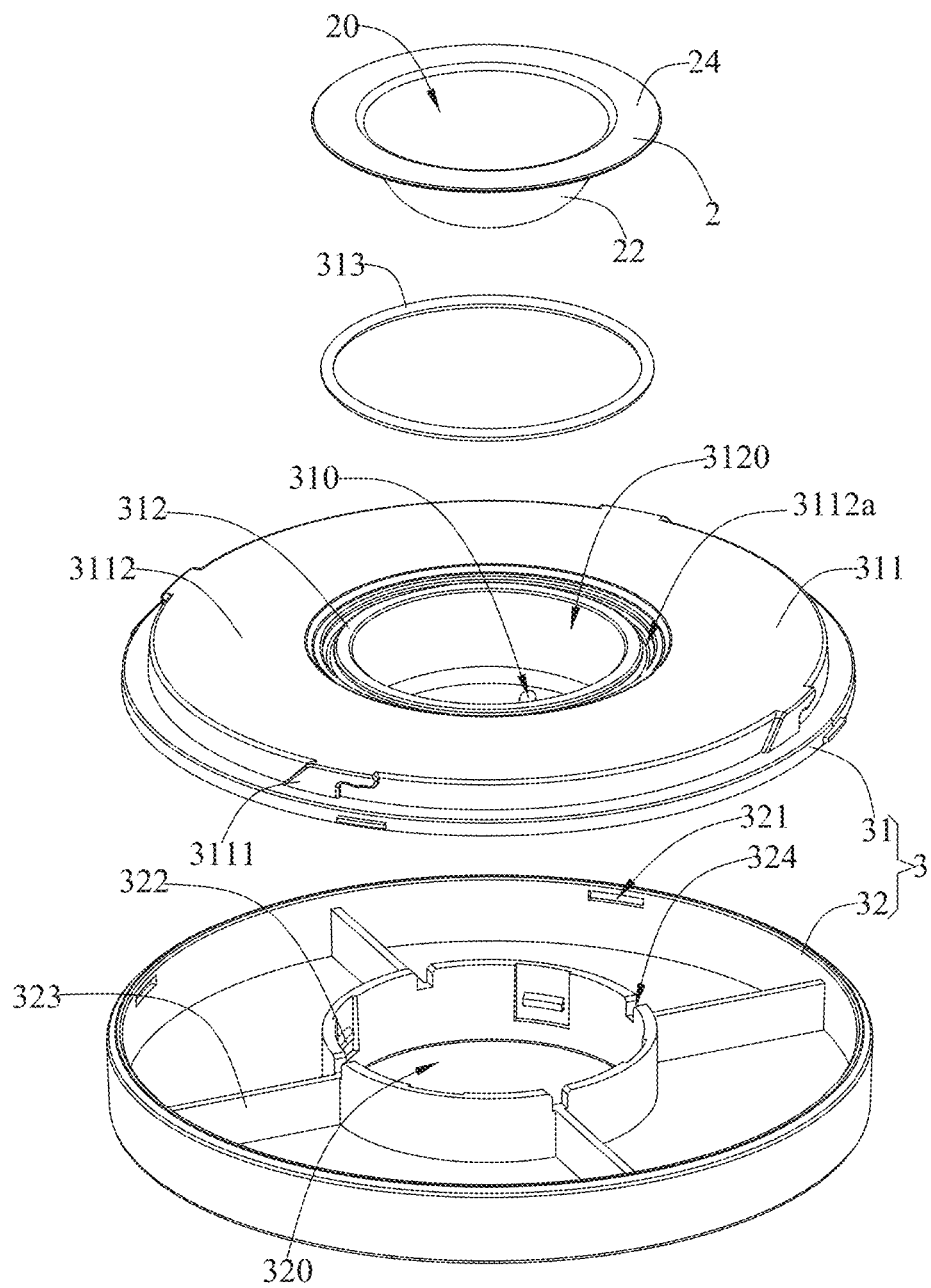
FIG. 19 is an exploded view of a pipe and a base according to an embodiment of the present disclosure.
Figure 20:
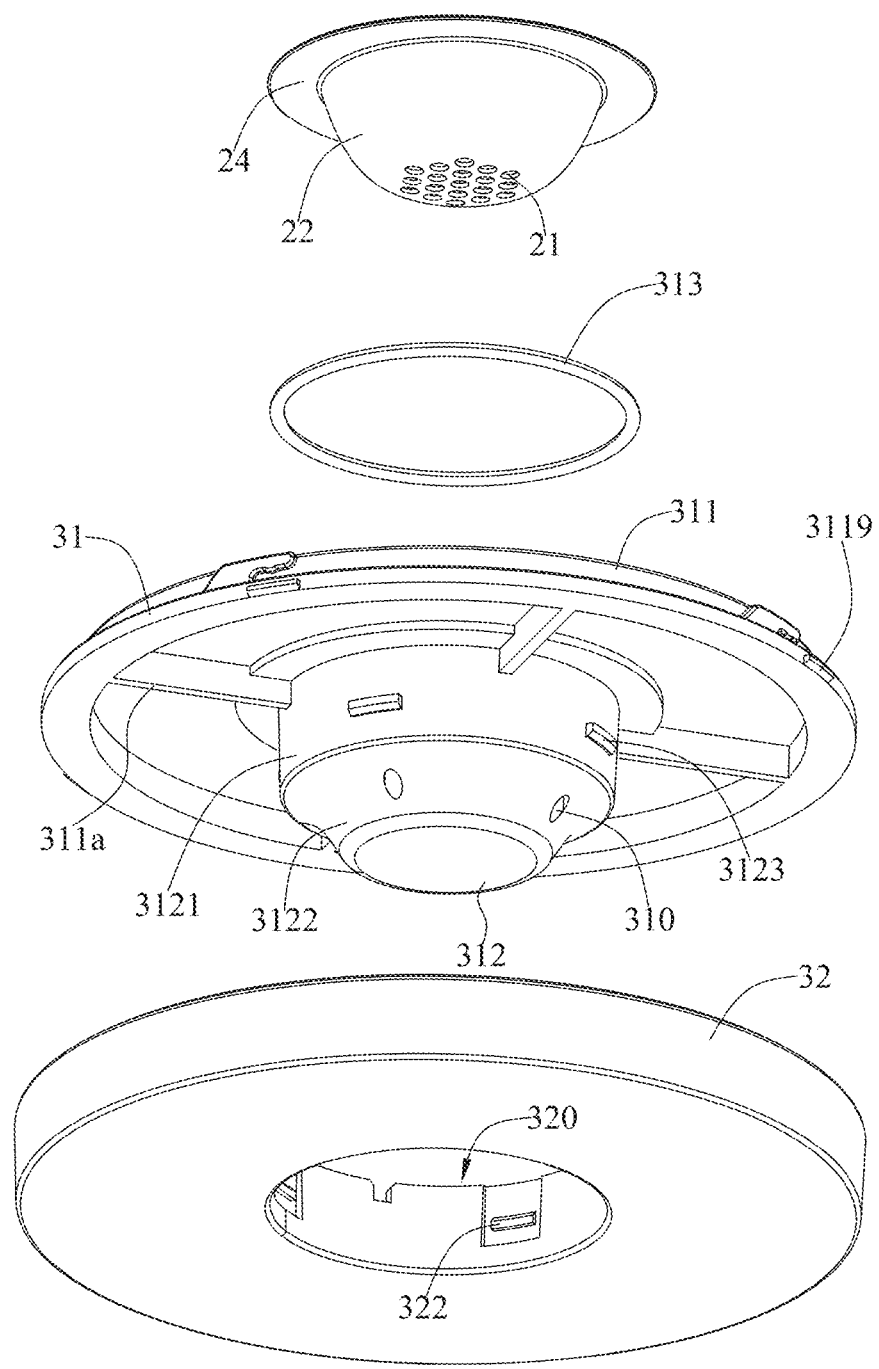
FIG. 20 is an exploded view of a pipe and a base according to another embodiment of the present disclosure.

As illustrated in FIG. 2, FIG. 19 and FIG. 20, in one embodiment, the base 3 includes a first base 31 and a second base 32. The first base 31 is detachably assembled with the smoker body 1. The first base 31 includes a first body 311 and a receiving cup 312. The receiving cup 312 is connected to the first body 311 and has a receiving cavity 3120. A cup mouth of the receiving cup 312 is connected to an end surface of the first body 311 proximal to the smoker body 1, and the pipe 2 is movably received in the receiving cavity 3120. A bottom of the receiving cavity 3120 is defined with a smoke outlet hole 310. The smoke outlet hole 310 penetrates the receiving cup 312, allowing that the smoke discharged from the smoke outlet port 21 to be expelled out of the smoker, thus achieving a quick output of smoke. The second base 32 is provided on a side of the first base 31 away from the smoker body 1. The second base 32 is detachably assembled with the first body 311. The second base 32 is provided with an assembly port, and the receiving cup 312 is assembled in the assembly port 320.

Figure 11:
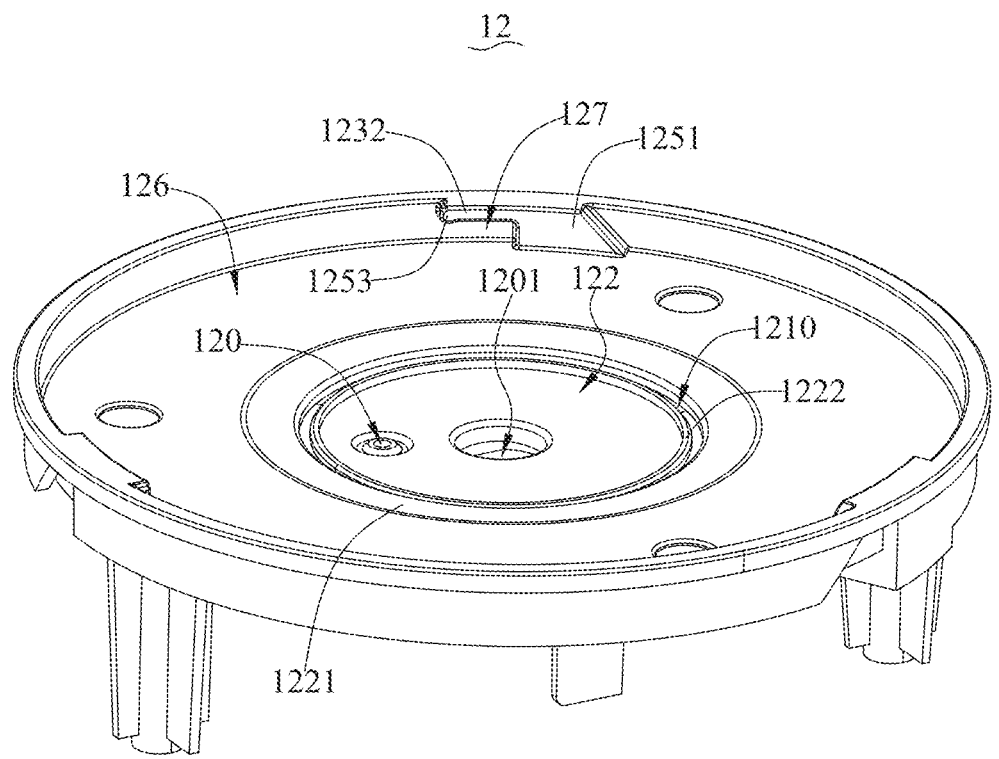
FIG. 11 is a schematic structural view of a bottom cover according to another embodiment of the present disclosure.
Figure 12:
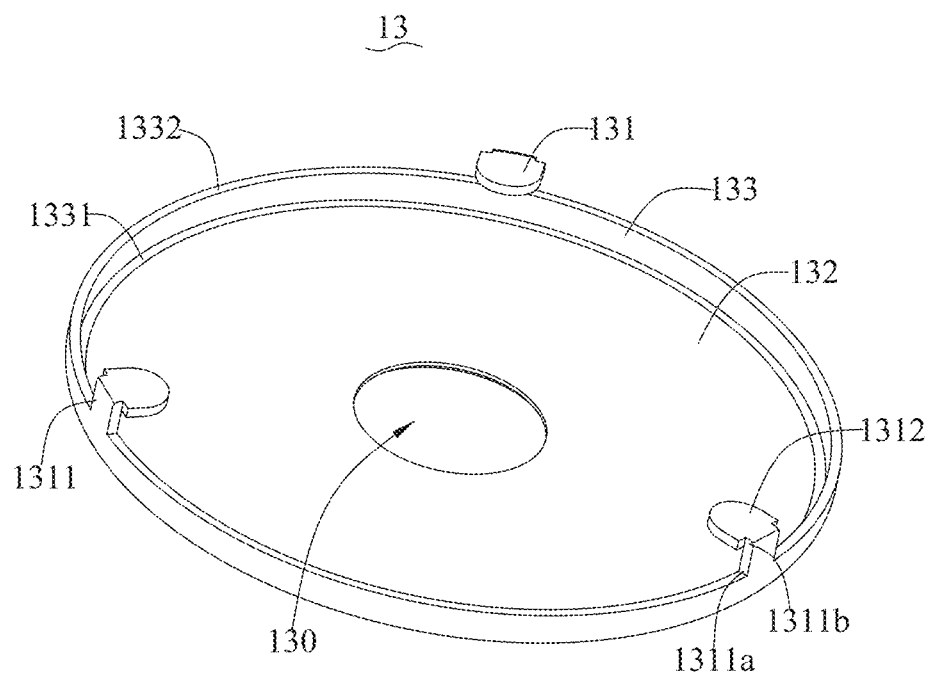
FIG. 12 is a schematic structural view of a thermal insulation cover according to an embodiment of the present disclosure.

As illustrated in FIG. 2 and FIG. 11, in one embodiment, a first snap-in part 125 is provided on a side of the bottom cover 12 away from the housing 11. A second snap-in part 3111 is provided on a side of the first body 311 proximal to the housing 11. The first snap-in part 125 engages with the second snap-in part 3111 to enable the smoker body 1 to be detachably assembled with the base 3.

In one embodiment, the first snap-in part 125 is a first magnet secured on the bottom cover 12, and the second snap-in part 3111 is a second magnet secured on the base 3. The smoker body 1 and the base 3 are magnetically secured through the first magnet and the second magnet.

In one embodiment, an assembly plate 3112 is protruded on one side of the first body 311 proximal to the smoker body 1, allowing the first body 311 to have a first side wall 3113 and a second side wall 3114. An end surface of the side of the bottom cover 12 proximal to the base 3 is defined with an assembly slot 126, and the assembly slot 126 fits to the assembly plate 3112, enabling the smoker body 1 and the base 3 to be more tightly engaged.

As illustrated in FIG. 19, in one embodiment, a cup mouth of the receiving cup 312 is connected to a top end surface of the assembly plate 3112. The top end surface of the assembly plate 3112 is defined with an annular groove 3112a surrounding a cup opening of the receiving cup 312, and a rubber sealing ring 313 is provided in the annular groove 3112a. The rubber sealing ring 313 can improve the tightness of the assembly between the pipe 2 and the first base 31, thereby preventing smoke from leaking out of the gap between the pipe 2 and the first base 31 and reducing the risk of the smoker being contaminated by smoke.

As illustrated in FIG. 2, FIG. 11, FIG. 19 and FIG. 20, in one embodiment, the first snap-in part 125 is protruded on a side wall of the assembly slot 126. The second snap-in part 3111 is protruded on the second side wall 3114.

In one embodiment, the first snap-in part 125 include a first stop section 1251 and a first snap-in section 1252. The first snap-in section 1252 is connected to the first stop section 1251, and one end of the first snap-in section 1252 that is distant from the first stop section 1251 extends toward a direction away from the first stop section 1251. The first stop section 1251, the first snap-in section 1252 and a bottom wall of the assembly slot 126 form a first snap-in interface 127.

The second snap-in part 3111 includes a second stop section 3115 and a second snap-in section 3116. The second snap-in section 3116 is connected to the second stop section 3115, and one end of the second snap-in section 3116 that is distant from the second stop section 3115 extends toward a direction away from the second stop section 3115. The second stop section 3115, the second snap-in section 3116 and the bottom of the assembly plate 3112 form a second snap-in interface 3117.

It should be noted that when the smoker body 1 is assembled with the base 3, the assembly plate 3112 is installed in the assembly slot 126, and an external force is applied to make the assembly plate 3112 and the assembly slot 126 rotate relative to each other, therefore the first snap-in section 1252 is snapped into the second snap-in interface 3117 and abuts against the second stop section 3115; meanwhile, the second snap-in section 3116 is snapped into the first snap-in interface 127 and abuts against the first stop section 1251. Therefore, the clamping assembly of the smoker body 1 and the base 3 is completed.

In one embodiment, one end of the first snap-in section 1252, which is away from the first stop section 1251, is provided with a first protrusion 1253 extends towards a bottom of the assembly slot 126. An end surface, which is proximal to the second base 32, of the second snap-in section 3116 is provided with a second protrusion 3118. Therefore, the second protrusion 3118 and a stop surface of the second stop section 3115 form a notch, which allows the first protrusion 1253 to be snapped in, thereby improving the stability and firmness of the assembly between the first snap-in part 125 and the second snap-in part 3111.

In the present embodiment, the base 3 is cylindrical. The assembly slot 126 is a slot with a circular cross section, and the assembly plate 3112 is a protrusion with a circular cross section. Four first snap-in parts 125 and four second snap-in parts 3111 are provided, arranged in a one-to-one correspondence. Four first snap-in parts 125 are arranged at equal intervals annularly on a side wall of the assembly slot 126, and four second snap-in parts 3111 are arranged at equal intervals annularly on a side wall of the assembly plate 3112. In other embodiments, the number of the first snap-in parts 125 and the second snap-in parts 3111 can be determined as needed, as long as that the first snap-in parts 125 and the second snap-in parts 3111 engage with each other, thus detachably assembling the base 3 and the smoker body 1.

As illustrated in FIG. 2, FIG. 11, FIG. 19 and FIG. 20, in one embodiment, the second base 32 has an inner cavity, and an inner side wall of the second base 32 is defined with a first snap-in groove 321. A first snap-in block 3119 is provided on the first side wall 3113 of the first body 311. When the first base 31 and the second base 32 are assembled, the first snap-in block 3119 is engaged with the first snap-in groove 321, thereby realizing the detachable assembly between the first base 31 and the second base 32.

In one embodiment, a radially extending first reinforcing rib 311a is provided on an end surface of the first body 311 proximal to the second base 32. A radially extending second reinforcing rib 323 is provided in an inner cavity of the second base 32, and the first reinforcing rib 311a and the second reinforcing rib 323 are provided in a one-to-one correspondence. An insertion port 324 corresponding to the second reinforcing rib 323 is provided on a side wall of the assembly port 320, and the insertion port 324 is configured for the first reinforcing rib 311a to be plugged in, allowing the first reinforcing rib 311a and the second reinforcing rib 323 to abut against each other, thereby improving the overall support strength of the base 3.

Figure 21:
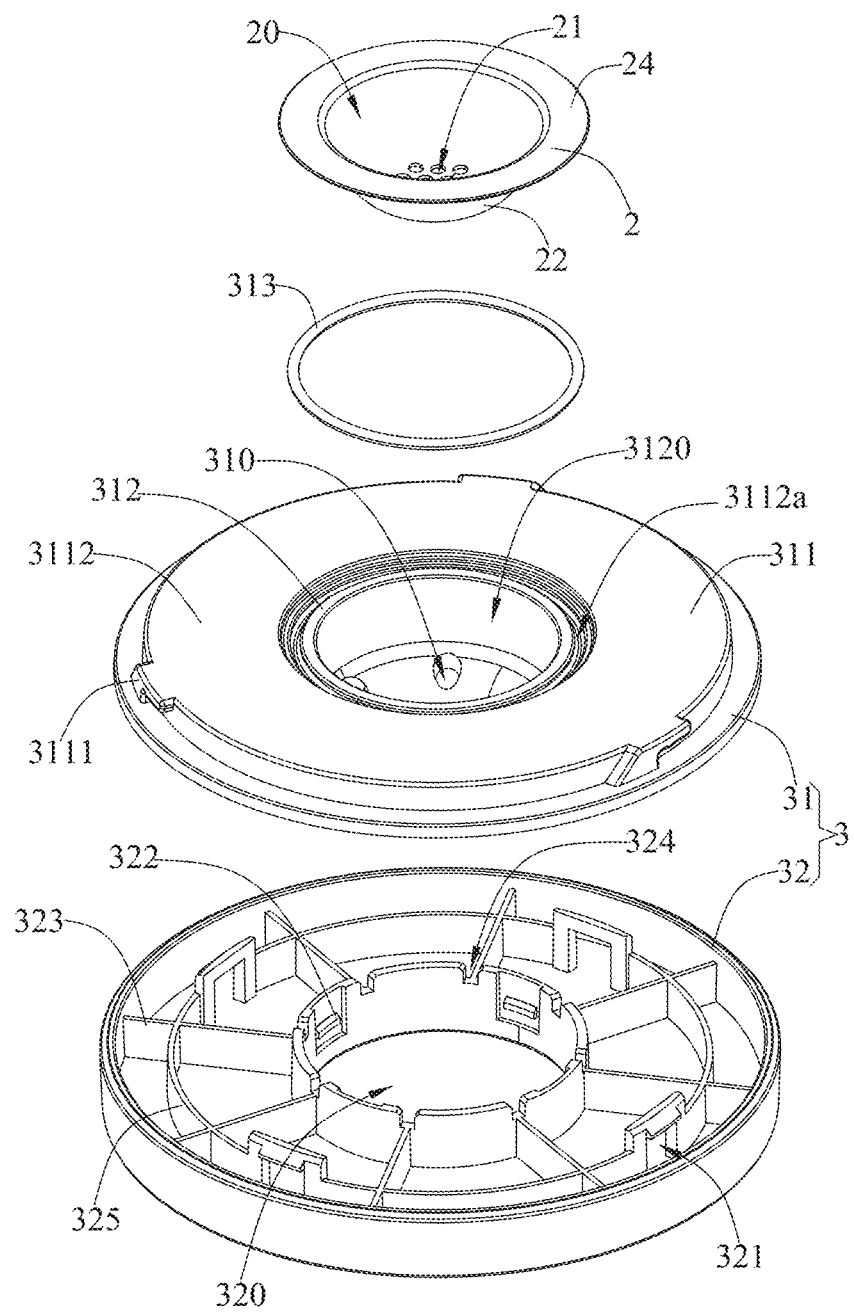
FIG. 21 is an exploded view of a pipe and a base according to another embodiment of the present disclosure.
Figure 22:
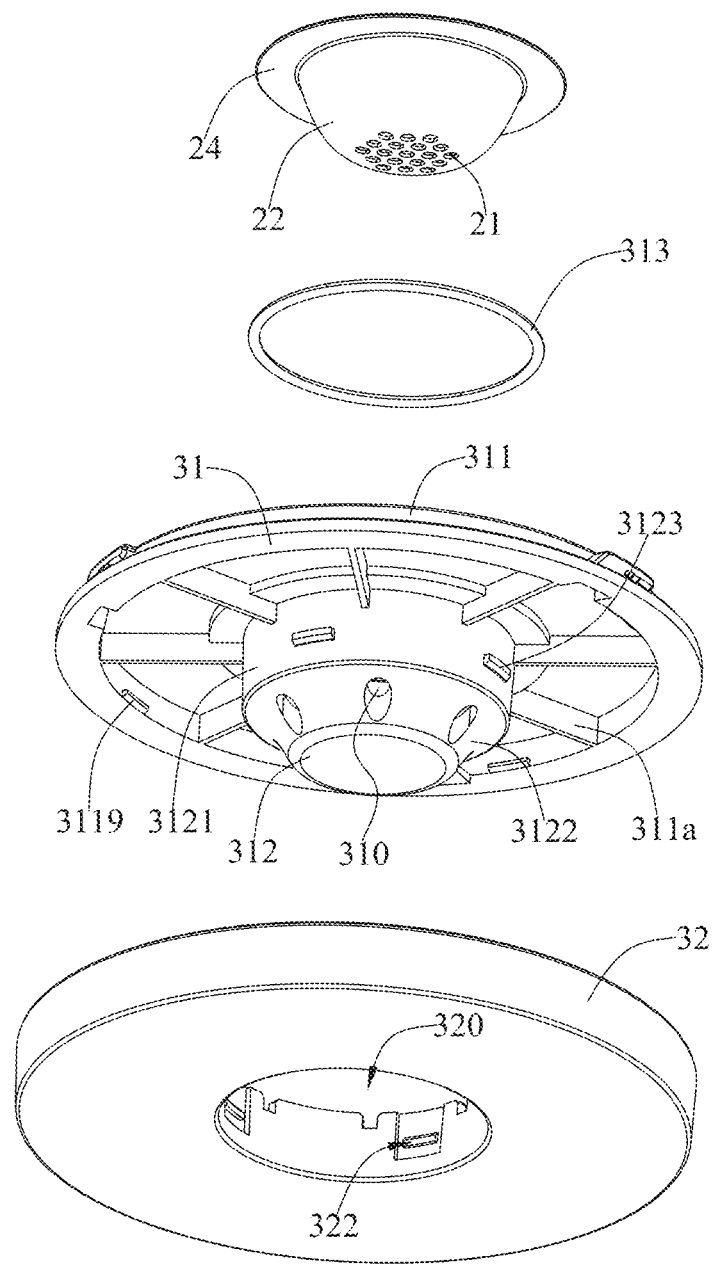
FIG. 22 is an exploded view of a pipe and a base according to another embodiment of the present disclosure.

As illustrated in FIG. 21 and FIG. 22, in one embodiment, an annular mounting strip 325 is provided in the inner cavity of the second base 32. The second reinforcing ribs 323 are all connected to the annular mounting strip 325, and the annular mounting strip 325 is coaxially arranged with the assembly port 320. A side wall of the annular mounting strip 325 is defined with the first snap-in groove 321. A first snap-in block 3119 is provided on the inner side wall of the first body 311 proximal to the second base 32. When the first base 31 and the second base 32 are assembled, the first snap-in block 3119 is engaged with the first snap-in groove 321, thereby realizing the detachable assembly between the first base 31 and the second base 32.

In the present embodiment, four first snap-in grooves 321 are provided, and are arranged at equal intervals annularly on the inner side wall of the second base 32. Four first snap-in blocks 3119 are correspondingly provided, and the four first snap-in blocks 3119 are arranged at equal intervals annularly on the first side wall 3113. In other embodiments, the number of first card snap-in blocks 3119 and first snap-in grooves 321 can be determined according to demand, and it only needs to meet the requirement that the first snap-in block 3119 engages with the first snap-in groove 321, thereby allowing the first base 31 and the second base 32 to be detachably assembled.

As illustrated in FIG. 2, FIG. 11, FIG. 19 and FIG. 20, in one embodiment, the receiving cup 312 includes an assembly part 3121 and a supporting part 3122. The assembly part 3121 is detachably assembled with a side wall of the assembly port 320. The supporting part 3122 is connected to a side of the assembly part 3121 away from the first body 311. The supporting part 3122 protrudes from an end surface of the second base 32 away from the first body 311 to support the base 3. It should be noted that the smoke outlet hole 310 is positioned on the supporting part 3122 and is configured to expel the smoke discharged from the smoke outlet port 21 out from the bottom of the smoker.

In one embodiment, the assembly port 320 is arranged in a middle portion of the second base 32, and the assembly port 320 is a through port with a circular cross section. A second snap-in slot 322 is arranged on a side wall of the assembly port 320. A second snap-in block 3123 is arranged on a side wall of the assembly part 3121. The second snap-in block 3123 is configured to engage with the second snap-in slot 322 to achieve the detachable assembly between the assembly port 320 and the assembly part 3121.

It should be noted that the first base 31 and the second base 32 are detachably assembled through the engagement between the first snap-in slot 321 and the first snap-in block 3119, as well as the second snap-in slot 322 and the second snap-in block 3123. The dual snap-in-fit design ensures a more secure assembly between the first base 31 and the second base 32.

In one embodiment, the supporting part 3122 is roughly in the shape of an inverted truncated cone. A starting position of the supporting part 3122 is flush with an end surface of one side of the second base 32 that is away from the first base 31, thereby ensuring the overall aesthetics of the smoker. An end surface of the supporting part 3122 on one side away from the second base 32 has a diameter smaller than that of the cross section of the starting position. The smoke outlet hole 310 is arranged on one side wall of the supporting part 3122, allowing the smoke discharged from the smoke outlet port 21 to be smoothly expelled from the accommodating cavity 3120.

Compared with the related art, the beneficial effects of the present disclosure are as follows.

1) The ignition needle 181 of the automatic igniter 18 is arranged in the air inlet port 130 and extends into the combustion chamber 20, allowing the ignition needle 181 to be at the upwind position. When the ignition needle 181 is ignited, the air enters the combustion chamber 20 from the air inlet port 130, promotes the combustion of the combustion medium, and enables the automatic igniter 18 to ignite the combustion medium in the combustion chamber 20 more easily and rapidly.

2) In the axial direction of the air inlet port 130, the projection position of the air inlet port 130 on the inner wall of the combustion chamber 20 at least partially overlaps with the position of the smoke outlet port 21. Such a design minimizes the distance between the air inlet port 130 and the smoke outlet port 21, allowing the air to pass through the combustion chamber 20 more quickly, which not only promotes the combustion of the combustion medium, but also accelerates the expulsion of smoke from the combustion chamber 20, thereby enhancing the smoke outlet speed of the smoker. In addition, it also prevents the smoke generated in the combustion chamber 20 from spreading towards smoker body 1, thus avoiding contamination of the smoker body 1. In the present embodiment, the air inlet port 130 is located directly above the smoke outlet port 21.

3) A space 10 is formed between the thermal insulation cover 13 and the bottom cover 12, enabling the air between the end surface of the thermal insulation cover 13 that fits the pipe 2 and the bottom cover 12 to form an insulation zone to isolate heat, thereby preventing the heat of the thermal insulation cover 13 from being directly transferred to the bottom cover 12.

4) The air inlet hole 120 is in communication with the air inlet port 130 through the space 10, allowing the combustion-supporting air to be sent into the combustion chamber 20. The air inlet hole 120 and the air inlet port 130 are staggered, generating a blocking effect on the combustion-supporting air entering the space 10, thereby causing the air in the space 10 to absorb part of the heat on the thermal insulation cover 13. In addition, the heat absorbed by the combustion-supporting air is expelled from the combustion chamber 20 along with the smoke, achieving a cooling effect for the thermal insulation cover 13. The automatic smoker configured in this way not only prevents the heat generated by combustion or incomplete combustion from being transferred to the smoker body 1 during operation, but also cool the thermal insulation cover 13, thereby improving the working environment of the smoker body 1 and enhances its service life.

5) A bevel 1221 is provided at the notch of the mounting groove 122. With such a configuration, when the smoker body 1 is assembled with the base 3, the direct contact between the pipe 2 and the bottom cover 12 can be effectively avoided, thereby avoiding the direct heat transfer from the pipe 2 to the bottom cover 12, further improving the insulation efficacy of the smoker body 1.

The above description is only some embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

What is claimed is:

1. An automatic smoker comprising:
   a smoker body;
   a pipe having a combustion chamber, wherein an inner wall of the combustion chamber is defined with at least one smoke outlet port; and
   a base, wherein the smoker body and the base are detachably assembled, and the pipe is arranged between the smoker body and the base;
   wherein the smoker body comprises an automatic igniter, the automatic igniter comprises an ignition needle, the ignition needle extends into the combustion chamber and is configured to ignite a combustion medium within the combustion chamber.

2. The automatic smoker according to claim 1, wherein the automatic igniter is arranged above the combustion chamber, and the ignition needle is arranged in a middle of the combustion chamber.

3. The automatic smoker according to claim 1, wherein the combustion chamber has an open mouth, and the smoker body comprises:
   a casing comprising a housing and a bottom cover, wherein the housing has a mounting cavity, and the bottom cover is connected to one side of the housing; and
   a thermal insulation cover arranged on one side of the bottom cover and connected to the bottom cover, wherein a projection position of the thermal insulation cover covers the open mouth of the combustion chamber.

4. The automatic smoker according to claim 3, wherein the bottom cover defines a plug-in hole, a side of the thermal insulation cover is arranged with a second connecting part configured to be detachably assembled with the plug-in hole.

5. The automatic smoker according to claim 3, wherein the automatic smoker further comprises:
   a circuit board arranged in the mounting cavity and connected to an inner wall of the mounting cavity, wherein the circuit board is electrically connected to the automatic igniter to control a start or stop of the automatic igniter; and
   a power supply arranged in the mounting cavity and connected to the inner wall of the mounting cavity, wherein the power supply is electrically connected to the circuit board to supply power to the automatic smoker.

6. The automatic smoker according to claim 5, wherein the automatic igniter further comprises:
   a needle seat comprising an assembly end and an ignition end, wherein the assembly end is secured to the bottom cover, the ignition end extends through the bottom cover into the combustion chamber, the needle seat defines a hole running through the assembly end and the ignition end, the ignition needle extends through the hole to allow a needle tip of the ignition needle to be exposed;
   a high-voltage component connected to the circuit board, wherein the high-voltage component is connected to the ignition needle through a wire to allow the needle tip of the ignition needle to ignite the combustion medium.

7. The automatic smoker according to claim 1, wherein the base comprises a first base detachably assembled with the smoker body, the first base comprises a first body and a receiving cup connected to the first body, the receiving cup has an accommodating cavity, an opening of the accommodating cavity is in communication with an end surface of the first body, and the combustion chamber is received in the receiving cup.

8. The automatic smoker according to claim 7, wherein a bottom of the accommodating cavity is defined with a smoke outlet hole running through the receiving cup.

9. The automatic smoker according to claim 8, wherein the base comprises a second base arranged on one side of the first base, wherein the second base is detachably assembled with the first body.

10. The automatic smoker according to claim 7, wherein the pipe comprises a pipe body with a flange comprising an anti-slip edge, the pipe body is movably accommodated in the accommodating cavity, the pipe body is defined with the combustion chamber, the at least one smoke outlet port runs through the pipe body and communicates with the accommodating cavity, and the flange abuts against the end surface of the first body.

11. The automatic smoker according to claim 10, wherein the end surface of the first body is defined with an annular groove in communication with the accommodating cavity, the anti-slip edge is received in the annular groove.

12. The automatic smoker according to claim 11, wherein a rubber sealing ring is arranged between the anti-slip edge and the first body, and the rubber sealing ring is disposed in the annular groove.

13. An automatic smoker comprising:
   a smoker body;
   a pipe having a combustion chamber, wherein an inner wall of the combustion chamber is defined with at least one smoke outlet port; and
   a base, wherein the pipe is arranged between the smoker body and the base, the smoker body and the base are detachably assembled, and the smoker body and the base are configured to secure the pipe therebetween during assembly; and
   wherein the smoker body comprises:
   a housing defining a mounting cavity, and
   a bottom cover, wherein the bottom cover is connected to one side of the housing close to the base, and the bottom cover is defined with an air inlet hole;
   a thermal insulation cover connected to the bottom cover, wherein the thermal insulation cover is defined with an air inlet port, a space is provided between the thermal insulation cover and the bottom cover, the air inlet hole is in communication with the air inlet port via the space, and the air inlet hole is staggered with the air inlet port;
   wherein the thermal insulation cover abuts against the pipe to close the combustion chamber in response to the smoker body being engaged with the base.

14. The automatic smoker according to claim 13, wherein a side of the bottom cover is provided with a first connecting part, a side of the thermal insulation cover is provided with a second connecting part, and the first connecting part and the second connecting part are detachably assembled.

15. The automatic smoker according to claim 14, wherein the first connecting part is a plug-in hole, and a hook part is arranged in the plug-in hole, the second connecting part comprises a connection section and a bending section, a first end of the connection section is connected to the thermal insulation cover, a second end of the connection section is connected to the bending section, and the bending section engages with the hook part to secure the thermal insulation cover.

16. The automatic smoker according to claim 15, wherein the thermal insulation cover comprises a cover body and an annular wall, a fixed end of the annular wall is connected to the cover body, a free end of the annular wall extends towards the bottom cover and abuts against the bottom cover to allow the space to be formed between the bottom cover and the cover body, and the second connecting part is connected to the free end of the annular wall.

17. The automatic smoker according to claim 16, wherein the bottom cover is defined with a mounting groove in communication with the air inlet hole, the thermal insulation cover is disposed in the mounting groove, and the free end of the annular wall abuts against an inner wall of the mounting groove.

18. The automatic smoker according to claim 13, wherein the base comprises:
   a first base detachably assembled with the smoker body, wherein the first base comprises a first body and a receiving cup connected to the first body, the receiving cup has an accommodating cavity, an opening of the accommodating cavity is connected to an end surface of the first body, and a bottom of the accommodating cavity is defined with a smoke outlet hole, and the smoke outlet hole runs through the receiving cup; and
   a second base arranged on one side of the first base, wherein the second base is detachably assembled with the first body, the second base is defined with an assembly port, and the receiving cup is assembled in the assembly port.

19. The automatic smoker according to claim 18, wherein a first snap-in part is provided on a side of the bottom cover, a second snap-in part is provided on a side of the first body, and the first snap-in part engages with the second snap-in part to allow the smoker body and the base to be detachably assembled.

20. The automatic smoker according to claim 19, wherein an assembly plate is protruded on one side of the first body, and an end surface of the bottom cover is defined with an assembly slot, and the assembly slot is fitted with the assembly plate; the first snap-in part is provided on an inner side wall of the assembly slot, and the second snap-in part is provided on an outer wall of the assembly plate; and
   the second base is defined with an assembly port fitted with the receiving cup, the receiving cup comprises a assembly part and a supporting part, the assembly part is detachably mounted on a sidewall of the assembly port, the supporting part is connected to a side of the assembly part, the supporting part protrudes from an end surface of the second base and configured to support the base, and the supporting part is defined with the smoke outlet hole.

* * * * *